(12) United States Patent
Honda et al.

(10) Patent No.: US 6,304,729 B2
(45) Date of Patent: *Oct. 16, 2001

(54) APPARATUS CAPABLE OF GENERATING PLACE INFORMATION

(75) Inventors: Tsutomu Honda, Sakai; Masataka Hamada, Osakasayama, both of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,418

(22) Filed: Apr. 7, 1999

(30) Foreign Application Priority Data

Apr. 10, 1998 (JP) .................................................. 10-099496

(51) Int. Cl.[7] .................................................. G03B 17/24
(52) U.S. Cl. .................. 396/310; 396/429; 348/116; 348/232; 342/357.09
(58) Field of Search ........................... 396/429, 310–321; 348/116, 222, 232; 342/357, 357.01, 357.06, 357.09; 358/906, 909.1; 455/66, 456; 340/539, 568.6, 990–996, 396

(56) References Cited

U.S. PATENT DOCUMENTS

| 5,335,072 | * | 8/1994 | Tanaka et al. ................... 348/232 |
| 6,181,878 | * | 1/2001 | Honda ............................... 395/310 |

FOREIGN PATENT DOCUMENTS 09 190413   7/1997  (JP) .

\* cited by examiner

*Primary Examiner*—David M. Gray
(74) *Attorney, Agent, or Firm*—Morrison & Foerster

(57) ABSTRACT

A camera is provided with a radio receiver for receiving electromagnetic waves transmitted from a given radio base station, a GPS receiver for receiving electromagnetic waves transmitted from each of a plurality of artificial satellites, a place information generator for generating place information based on one of electromagnetic waves received by the radio receiver and electromagnetic waves received by the GPS receiver, and a selector for selecting activation of one of the radio receiver and the GPS receiver, the selector judging whether the receptive state of the radio receiver is satisfactory, and selecting activation of the GPS receiver if the receptive state of the radio receiver is judged to be unsatisfactory.

28 Claims, 9 Drawing Sheets

FIG. 2

TABLE A

| SIG 1 bit | CONTENT |
|---|---|
| 0 | DOMESTIC(JAPAN) |
| 1 | FOREIGN |
| | |
| | |
| | |
| | |

TABLE B

| SUB 6 bit | CONTENT |
|---|---|
| 0 | |
| 1 | KINKI |
| 10 | OSAKA-FU |
| 11 | HYOGO-KEN |
| 100 | SHIGA-KEN |
| 101 | NARA-KEN |
| . | . |

TABLE C

| SUB 6 bit | CONTENT |
|---|---|
| 0 | |
| 1 | KOBE |
| 10 | ASHIYA |
| 11 | NISHINOMIYA |
| 100 | KINOSAKI |
| 101 | HIMEJI |
| . | . |

TABLE D

| LEAST 3 bit | CONTENT |
|---|---|
| 0 | |
| 1 | PORT ISLAND |
| 10 | IJINKAN |
| 11 | SANNOMIYA |
| 100 | MOTOMACHI |
| 101 | ROKKO |
| . | . |

FIG. 9

| SIG 1 bit | CONTENT |
|---|---|
| 0 | DOMESTIC(U.S.A) |
| 1 | FOREIGN |
| | |
| | |
| | |
| | |
| | |

TABLE A

| SUB 6 bit | CONTENT |
|---|---|
| 0 | |
| 1 | NEW YORK |
| 10 | CALIFORNIA |
| 11 | WASHINGTON |
| 100 | ILLINOIS |
| 101 | INDIANA |
| · | · |

TABLE B

| SUB 6 bit | CONTENT |
|---|---|
| 0 | |
| 1 | SAN FRANCISCO |
| 10 | SAN JOSE |
| 11 | LOS ANGELES |
| 100 | SAN DIEGO |
| 101 | SANTA ANA |
| · | · |

TABLE C

| LEAST 3 bit | CONTENT |
|---|---|
| 0 | |
| 1 | LONG BEACH |
| 10 | TORRANCE |
| 11 | COMPTON |
| 100 | BEVERLY HILLS |
| 101 | HOLLYWOOD |
| · | · |

TABLE D

APPARATUS CAPABLE OF GENERATING PLACE INFORMATION

This application is based on patent application No. 10-99496 filed in Japan, the contents of which is hereby incorporated by reference.

BACKGROUND OF THE INVENTION

This invention relates to an apparatus capable of generating place information, in particular to a camera capable of recording an optical image of an object in a recording medium together with place information.

There has been known a camera internally provided with a GPS (Global Positioning System) which enables the recording of place information as shown in Japanese Unexamined Patent Publication No. 4-70727. As well-known, this GPS is a positioning system of high accuracy which receives data transmitted from at least three artificial satellites by a receiver on the earth and measures a three-dimensional position of the receiver based on the received data. In the camera internally provided with such a GPS, place information corresponding to a photographed image can be automatically recorded in a recording medium. This frees a camera operator from a cumbersome operation of manually inputting a place information every time photographing is performed, thereby making the camera much more convenient to use. Further, since the GPS is utilized, the camera can be advantageously used not only in a particular area, but also all over the world.

However, in the camera having a built-in GPS, a power consumption increases since it takes a long time for the data reception of the GPS and highly complicated operations are necessary. This results in a larger built-in battery and thus a larger camera. Further, it is sometimes difficult to receive electromagnetic waves used in the GPS indoors or in a place where large buildings stand one after another. This causes the problem that place information cannot be obtained when necessary.

SUMMARY OF THE INVENTION

It is an object of the present invention to provide a place information obtainable apparatus which has overcome the problems residing in the prior art.

According to an aspect of the present invention, an apparatus comprises: a radio receiver which receives electromagnetic waves transmitted from a given radio base station, the electromagnetic waves containing base information concerning an identification of the given radio base station; a GPS receiver which receives electromagnetic waves transmitted from each of a plurality of artificial satellites, the electromagnetic waves containing information useable for positioning; a place information generator which generates place information based on one of the base information of the electromagnetic waves received by the radio receiver and the information of the electromagnetic waves received by the GPS receiver; and a selector which selects activation of one of the radio receiver and the GPS receiver, the selector judging whether the receptive state of the radio receiver is satisfactory during activation of the radio receiver, and selecting activation of the GPS receiver if the receptive state of the radio receiver is judged to be unsatisfactory.

According to another aspect of the present invention, an apparatus comprises: a radio receiver which receives electromagnetic waves transmitted from a given radio base station, the electromagnetic waves containing base information concerning an identification of the given radio base station; and a GPS receiver which receives electromagnetic waves transmitted from each of a plurality of artificial satellites, the electromagnetic waves containing information useable for positioning; wherein, under a control of a prescribed controller, it is judged whether the receptive state of the radio receiver is satisfactory, and place information is obtained based on the base information of the electromagnetic waves received by the radio receiver if the receptive state of the radio receiver is judged to be satisfactory, and place information is obtained based on the information of the electromagnetic waves received by the GPS receiver if the receptive state of the radio receiver is judged to be unsatisfactory.

According to still another aspect of the present invention, an apparatus comprises: a first radio receiver which receives electromagnetic waves transmitted from a given radio base station of a first radio communications system, the electromagnetic waves containing base information concerning an identification of the given radio base station; a second radio receiver which receives electromagnetic waves transmitted from a given radio base station of a second radio communications system different from the first radio communications system, the electromagnetic waves containing base information concerning an identification of the given radio base station; and a GPS receiver which receives electromagnetic waves transmitted from each of a plurality of artificial satellites, the electromagnetic waves containing information useable for positioning; wherein, under a control of a prescribed controller, it is judged whether the receptive state of the first radio receiver is satisfactory, and place information is adopted based on the base information of the electromagnetic waves received by the first radio receiver if the receptive state of the first radio receiver is judged to be satisfactory, it is judged whether the receptive state of the second radio receiver is satisfactory if the receptive state of the first radio receiver is judged to be unsatisfactory, and place information is adopted based on the base information of the electromagnetic waves received by the second radio receiver if the receptive state of the second radio receiver is judged to be satisfactory, it is judged whether the receptive state of the GPS receiver is satisfactory if the receptive state of the second radio receiver is judged to be unsatisfactory, and place information is adopted based on the information of the electromagnetic waves received by the GPS receiver if the receptive state of the GPS receiver is judged to be satisfactory, and pre-stored place information is adopted if the receptive state of the GPS receiver is judged to be unsatisfactory.

These and other objects, features and advantages of the present invention will become more apparent upon a reading of the following detailed description and accompanying drawings.

BRIEF DESCRIPTION OF THE DRAWINGS

FIG. 2 is a diagram showing a filing format of pieces of place information in a ROM table used in the camera;

FIG. 9 is a diagram showing another filing format of pieces of place information in a ROM table used in the camera.

DETAILED DESCRIPTION OF THE PREFERRED EMBODIMENTS OF THE INVENTION

Figure 1:
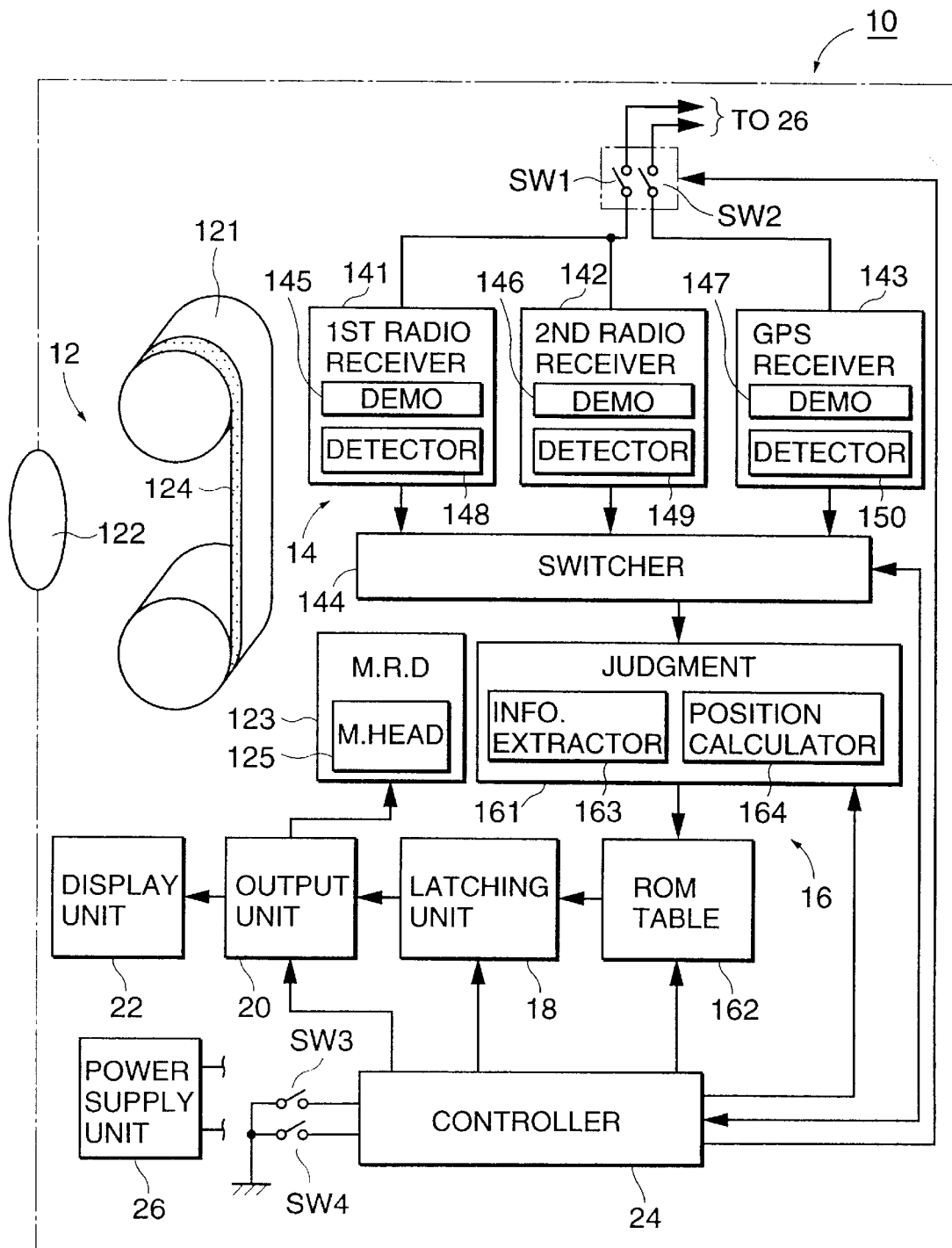
FIG. 1 is a block diagram showing a construction of a camera according to one embodiment of the invention.

FIG. 1 is a block diagram of a camera according to one embodiment of the invention. It should be appreciated that the term "unit" recited in the following description and claims means a part that accomplishes a predetermined function in association with other parts as well as an independent part. In FIG. 1, a camera 1 is provided with an image sensing unit 12, a receiving unit 14, a place information generating unit 16, a latching unit 18, an output unit 20, a display unit 22, a controller 24 and a power supply unit 26 including a built-in battery. The image sensing unit 12 records an optical image of an object in a recording medium. The receiving unit 14 receives electromagnetic waves transmitted from base stations and artificial satellites. The place information generating unit 16 generates place information from information received by the receiving unit 14. The latching unit 18 latches or memorizes place information outputted from the place information generating unit 16. The output unit 20 sends place information latched by the latching unit 18 to the display unit 22, and the display unit 22 displays received place information. The controller 24 controls the overall operation of the camera, and the power supply unit 26 supplies a power to the respective elements.

The image sensing unit 12 adopts a photographic system which is loaded with a roll of film 121 as a recording medium, a lens 122 for focusing an object image on the film 121 as an optical image and a magnetic recording device 123 for recording place information together with date information when photographing is made to the film 121. A magnetic material is applied onto the film 121, and the information is recorded thereby forming a magnetic recording area 124. The magnetic recording device 123 has a magnetic head 125 and is adapted to record the coded place information sent from the output unit 20 in the magnetic recording area 124 of the film 121. The place information and other information recorded in the magnetic recording area 124 are used to search the photographed frame and to display the name of place and the date when the object image was exposed to the film 121.

The receiving unit 14 includes a first radio receiver 141, a second radio receiver 142, a GPS receiver 143 and a selector 144 for selectively connecting one of the first and second radio receivers 141, 142 and the GPS receiver 143 with the place information generating unit 16.

The first radio receiver 141 receives electromagnetic waves of a relative small area radio communications system (e.g., an output electromagnetic wave of about 20 mW) containing ID information of a base station or base information transmitted from the base station of the small area radio communications system. As small area radio communications system, for example, there is provided the personal handyphone system (PHS) in Japan.

The second radio receiver 142 receives electromagnetic waves of a relative large area radio communications system containing ID information of a base station or base information transmitted from the base station of the large area radio communications system. As large area radio communications system, for example, there is provided the mobile (handy) phone system in Japan.

The GPS receiver 143 receives electromagnetic waves transmitted from a plurality of artificial satellites. The electromagnetic waves contain information regarding the position of each satellite, time and other items.

The first and second radio receivers 141, 142 and the GPS receiver 143 are provided with demodulators 145, 146, 147 for demodulating the received signals and reception detectors 148, 149, 150 for detecting the receptive states thereof, respectively. The reception detectors 148, 149, 150 are adapted to, for example, detect voltages received by the demodulators 145, 146, 147. These voltage values are compared with a reference voltage value in the controller 24, and each state is judged to be satisfactory if the received voltage value is equal to or larger than the reference voltage value while being judged to be unsatisfactory if it is below the reference voltage value. It should be noted that the respective receivers 141, 142, 143 are provided with special antennas, which could be used in common.

With the first and second radio receivers 141, 142 are connected the power supply unit 26 via a common power supply switch SW1. The two radio receivers 141, 142 are simultaneously activated by turning the power supply switch SW1 on. With the GPS receiver 143 is connected the power supply unit 26 via a power supply switch SW2. The GPS receiver 143 is activated by turning the power supply switch SW2 on. These power supply switches SW1, SW2 are on-off controlled by the controller 24.

In the case that the first and second radio receivers 141, 142 are used, the power consumption is smaller than in the case where the GPS receiver 143, which necessitates complicated operations in calculating the longitude and latitude in a judgment unit 161, since the ID information is extracted from the electromagnetic waves transmitted from the base station by the judgment unit 161 and only the extracted ID information is used.

The selector 144 includes an electronic switch controlled by the controller 24 and firstly connects the first radio receiver 141 with the place information generating unit 16 over the other receivers 142, 143. Then, it is judged whether or not the receptive state of the first radio receiver 141 is satisfactory. If the receptive state is not satisfactory, the selector 144 preferentially connects the second radio receiver 142 with the place information generating unit 16 over the GPS receiver 143, thereby selecting the positioning operation. It is judged whether or not the receptive state of the second radio receiver 142 is satisfactory. If the receptive state is not satisfactory, the selector 144 connects the GPS receiver 143, thereby selecting the positioning operation. In other words, the selector 144 constructs, in cooperation with the controller 24, a selector for selecting one of a plurality of receivers 141, 142, 143 according to the receptive states of the respective receivers 141, 142, 143.

The place information generating unit 16 is adapted to judge the location of the camera 10 (i.e., place of photographing) and to output the judgment result as place information, and is provided with the judgment unit 161 and a ROM (read only memory) table 162. The judgment unit 161 includes an information extractor 163 and a position calculator 164. The information extractor 163 obtains a position information by extracting the ID information (base information) of the base station contained in the signals demodulated by the first and second radio receivers 141, 142. The position calculator 164 executes a specified operation using the pieces of information which are from at least three artificial satellites and were demodulated by the GPS receiver 143 and obtains position information defined by the longitude and latitude. The operation for obtaining position information of longitude and latitude may be performed by the controller 24.

The ROM table 162 stores the ID information of the respective base stations and the place information allotted to the ID information and indicating where the base stations are located in the form of a table while corresponding them with one another. For example, a certain ID information is allotted to a base station located in Sannomiya (area included in the city of Kobe-shi), Kobe-shi ("-shi" means city in Japanese), the coded place information "Kobe" and "Sannomiya" are stored while being corresponded with the ID information. As a result, as the ID information is extracted by the information extractor 163, the place information corresponding to the extracted ID information is read from the ROM table 162 and "Kobe" and "Sannomiya" are outputted as place information.

In the ROM table 162 are also stored coded place information corresponding to calculated longitude and latitude as well as ID information of base stations. For example, if the north latitude of 42° and the east longitude of 135° are calculated, this place represents Sannomiya, Kobe-shi and "Kobe" and "Sannomiya" are outputted as place information.

In the case that the camera 10 is located within an overlapping service area of a plurality of base stations, the ID information of the base station having a most satisfactory receptive state may be extracted and place information may be obtained from such ID information. Alternatively, the ID information of a plurality of base stations may be extracted and optimal place information may be obtained in consideration of other factors such as the wave intensities of the electromagnetic waves from the respective base stations. If pieces of ID information of a plurality of base stations are extracted in this way, place information of a higher accuracy can be obtained.

FIG. 2 is a diagram showing a filing format of place information in the ROM table 162. In this embodiment, the place information is represented by 16-bit data. Specifically, each element of table A represented by the most significant bit is allotted with table B including a plurality of elements represented by six subsequent bits. Each element of table B is allotted with table C including a plurality of elements represented by six further subsequent bits. Each element of table C is allotted with table D including a plurality of elements represented by three least significant bits. Table A contains elements "Domestic" and "Foreign". Table B contains elements representing regions or prefectures such as "Kinki", "Osaka-fu" and "Nara-ken". Table C contains elements representing cities such as "Kobe", "Ashiya". Table D contains elements representing towns and places of interest such as "Sannomiya" (area in the city of Kobe-shi), "Ijinkan" (sightseeing spot in the city of Kobe-shi)

In the case of a small area radio communications system such as PHS in Japan, service areas of the respective base stations are smaller than those of a large area radio communications system such as ordinary mobile (handy) phone in Japan. Accordingly, the place information allotted to the ID information of each station is more detailed, and can contain the town or place of interest or the like represented by the three least significant bits. On the other hand, in the case of a large area radio communications system, the place information cannot contain the name of place represented by the three least significant bits since the service areas of the respective base stations are wider than those of the PHS.

Referring back to FIG. 1, the latching unit 18 latches place information read from the ROM table 162 and outputs latched place information to the output unit 20 in accordance with a command from the controller 24. The latching unit 18 renewably latches place information every time place information is outputted from the place information generating unit 16, and does so even after outputting place information to the output unit 20.

The output unit 20 sends place information outputted from the latching unit 18 in accordance with a command from the controller 24 while converting it into character information. The output unit 20 also sends converted character information to the magnetic recording device 123 of the image sensing unit 12 after recording it.

The display unit 22 includes a liquid crystal display panel or the like and displays place information sent from the output unit 20 together with other pieces of information. Although place information is displayed only during photographing in this embodiment, it may continue to be displayed till next photographing.

Figure 3:
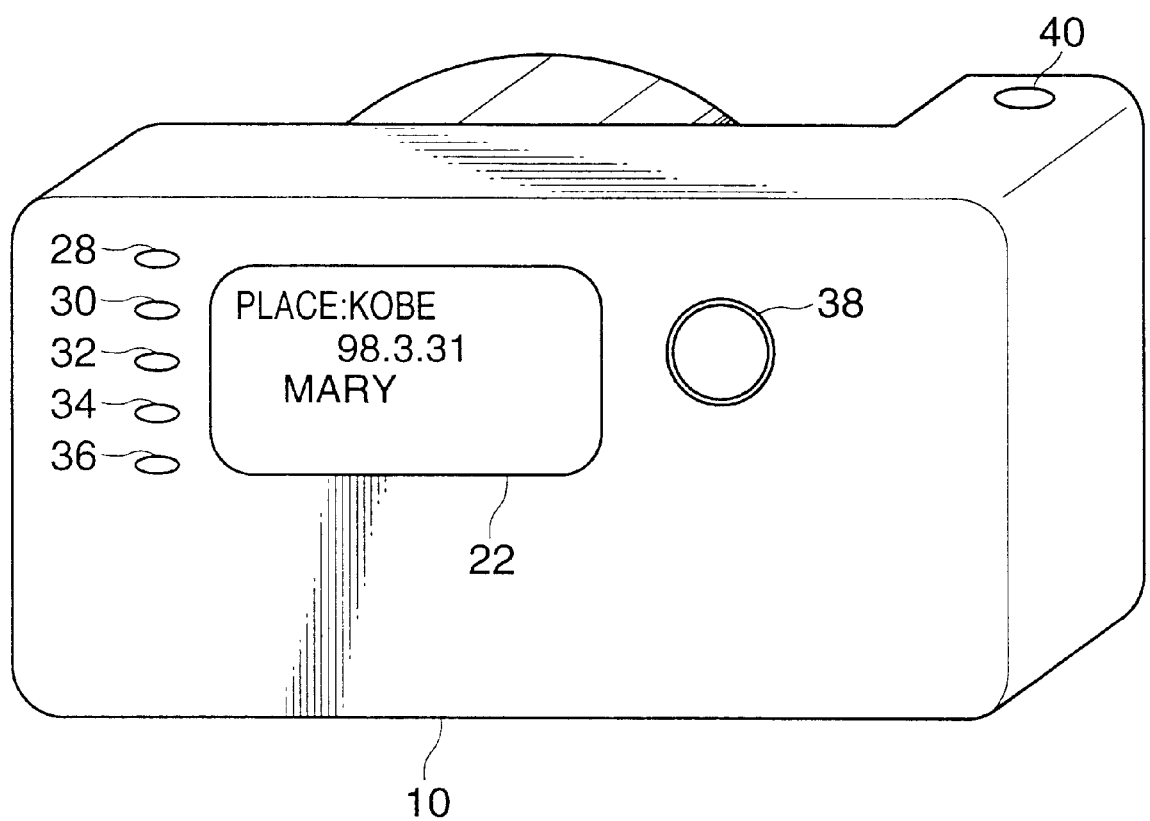
FIG. 3 is a schematic perspective view from behind the camera, showing one display mode of the camera.

FIG. 3 is a diagram showing one display mode in the display unit 22. The display unit 22 is, for example, provided on the rear surface of the camera 10, and the place of photographing, date of photographing and the name of an object are successively displayed from above. The date of photographing is obtained from data outputted from a clock provided in the camera 10. The name of an object (name of a person "Mary" in FIG. 3) is manually inputted by means of specified buttons so as to be displayed. It should be noted that not the name of place in table D of FIG. 2, but the one in table C is displayed in an initial state even in the case that the camera 10 is located within the service area of the PHS.

The place of name displayed by the initialization is changeable by the following operation. A specific case where the camera 10 is, for example, located in "Sannomiyal", "Kobe" within the service area of the large and small area radio communications services is described. In this case, the first radio receiver 141 normally operates and "Kobe" stored in table C is displayed at the right side of a caption "Place of Photographing" of the display unit 22 in the initial state. At this time, if, for example, a button 28 provided at a left side position of the display unit 22 is pressed, the display at the right side of "Place of Photographing" of the display unit 22 is changed from "Kobe" to "Sannomiya", which is the place information obtained by the reception of the PHS.

In the case that the camera 10 is, for example, located indoors or in a place where the receptive state of the electromagnetic waves of the large area radio communications system is satisfactory, but that of the electromagnetic waves of the small area radio communications system (PHS) is not satisfactory, the second radio receiver 142 operates and "Kobe" is displayed in the display unit 22. When an operator of the camera 10 wishes to select the name of place corresponding to table D, three names of places stored in table D are displayed as candidates below "Place of Photographing" as shown in FIG. 4 if, for example, a button 36 provided at a left side position of the display unit 22 is pressed.

By turning a dial 38 provided at a right side position of the display unit 22, these three names of places are changed to other names of places extracted from table D according to the rotating direction and rotating amount of the dial 38. For example, the next candidate is displayed if the dial 38 is turned clockwise, whereas the previous candidate is displayed if it is turned counterclockwise. If one of the three names of places displayed in the display unit 22 corresponds to the location of the camera 10, this name of place is selected by pressing the corresponding one of the buttons 30, 32, 34. Such an operation can be adopted even when a landscape in the distance different from the location of the camera 10 is to be photographed using a telephoto lens.

Also, in the case that the camera 10 is, for example, located in an overlapping service area of three base stations of the small area radio communications system (PHS), three names of places in table D corresponding to the service areas are displayed below "Place of Photographing" and one of them is selected by pressing any one of the buttons 30, 32, 34. If the camera 10 is located in an overlapping service area of the two base stations, two place names are displayed. If the camera 10 is located in an overlapping service area of four or more base stations, three place names are displayed and the remaining place names are displayed according to the rotation of the dial 38, thereby enabling the operator to select a desired name of place.

Figure 4:
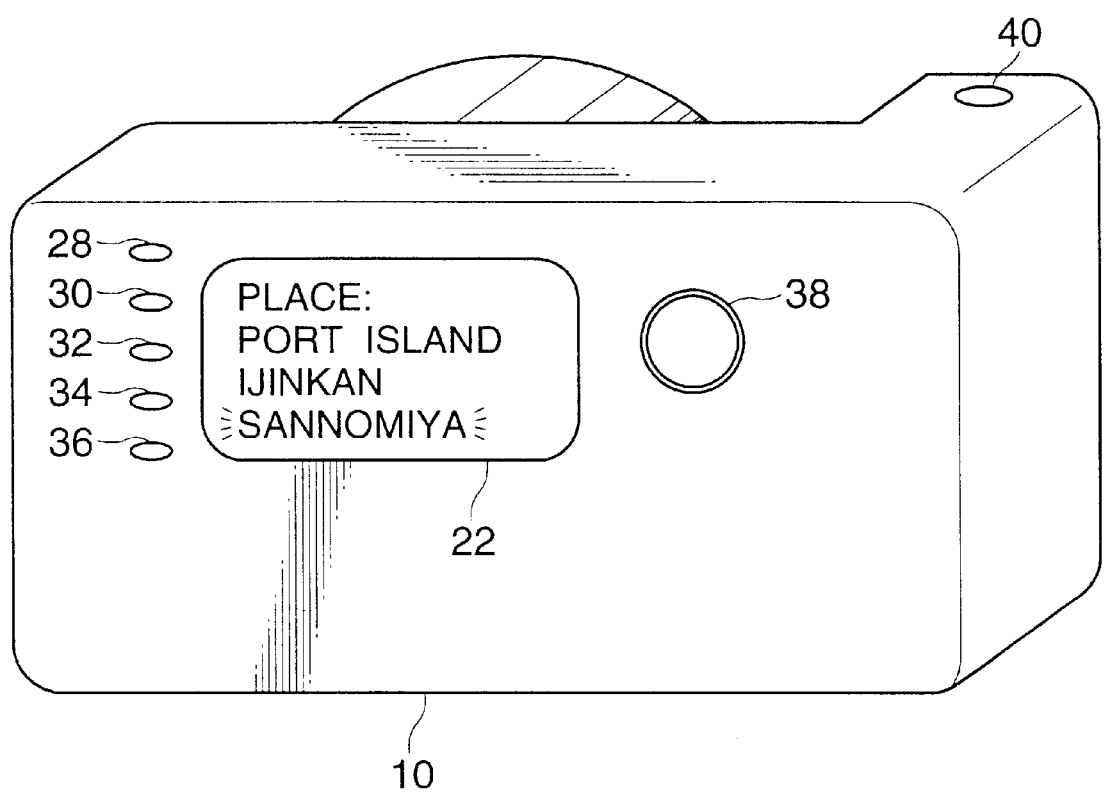
FIG. 4 is a schematic perspective view from behind the camera, showing another display mode of the camera.

As shown in FIGS. 3 and 4, a release button 40 is provided at the right side of the upper surface of the camera 10. The buttons 28, 30, 32, 34, 36, the dial 38 and the release button 40 are connected with the controller 24, respectively, so as to perform specified operations.

Referring back to FIG. 1, the controller 24 includes a CPU for performing specified calculations and controls, a ROM for storing specified operation programs, a RAM for temporarily storing data, and the like. The controller 24 controls the overall operation of the camera 10 including the selecting control of the selector 144 and the write control of the magnetic recording device 123. with the controller 24 are connected a switch SW3 for detecting whether the release button 40 has been pressed halfway and a switch SW4 for detecting whether the release button 40 has been fully pressed.

Figure 5:
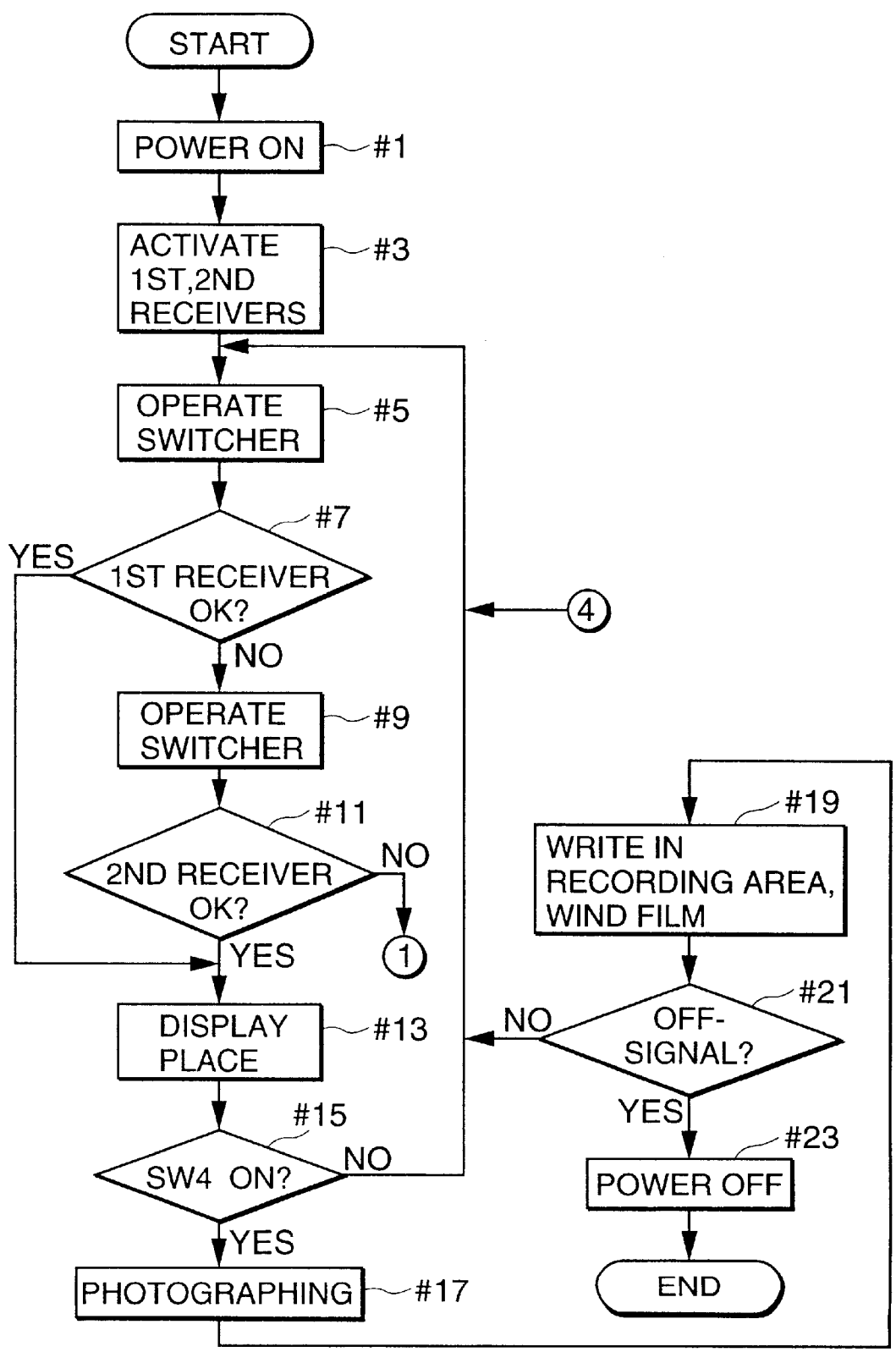
FIGS. 5 to 7 combinedly show a flow chart showing one exemplary operation of the camera.
Figure 6:
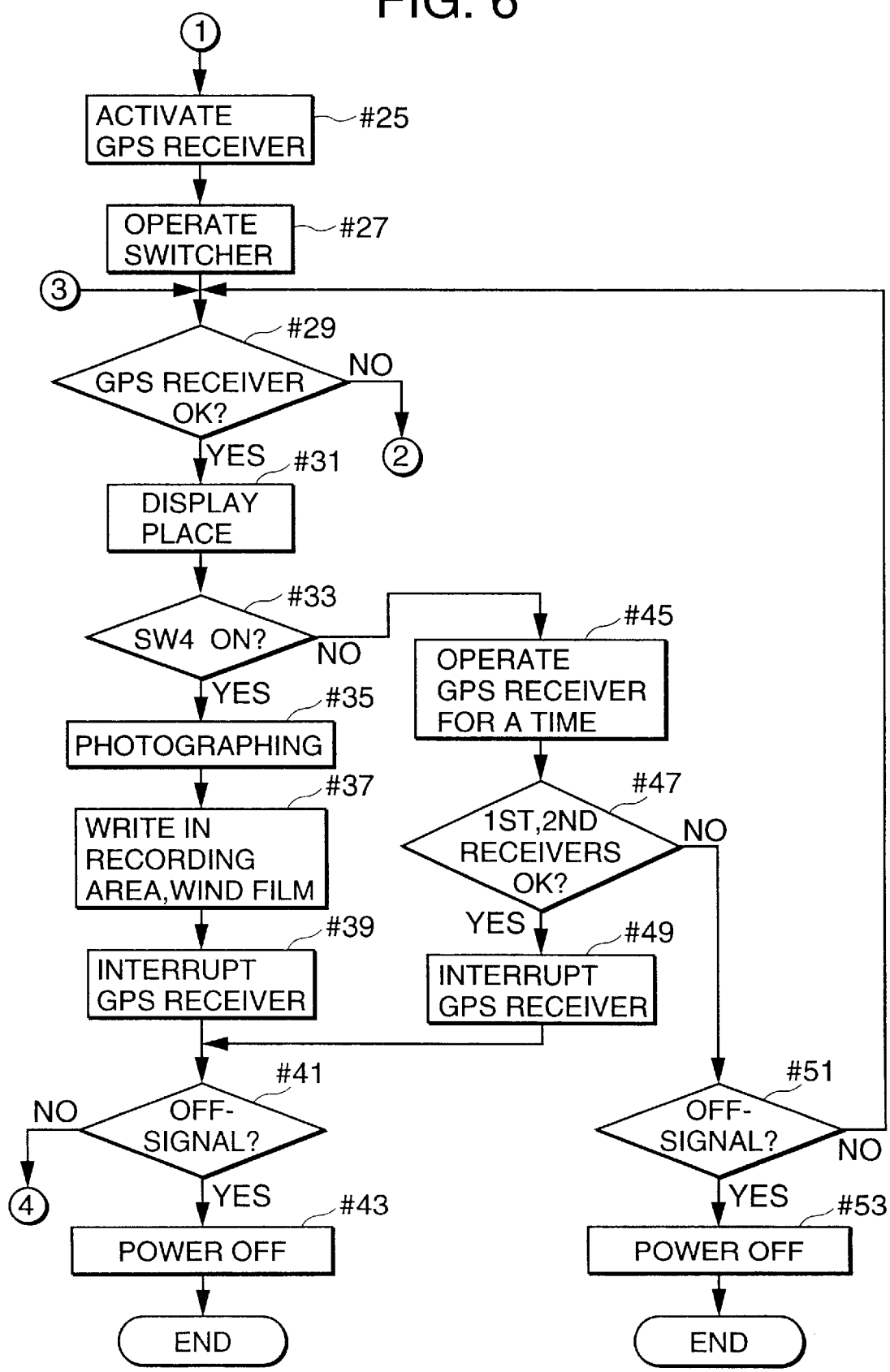
Figure 7:
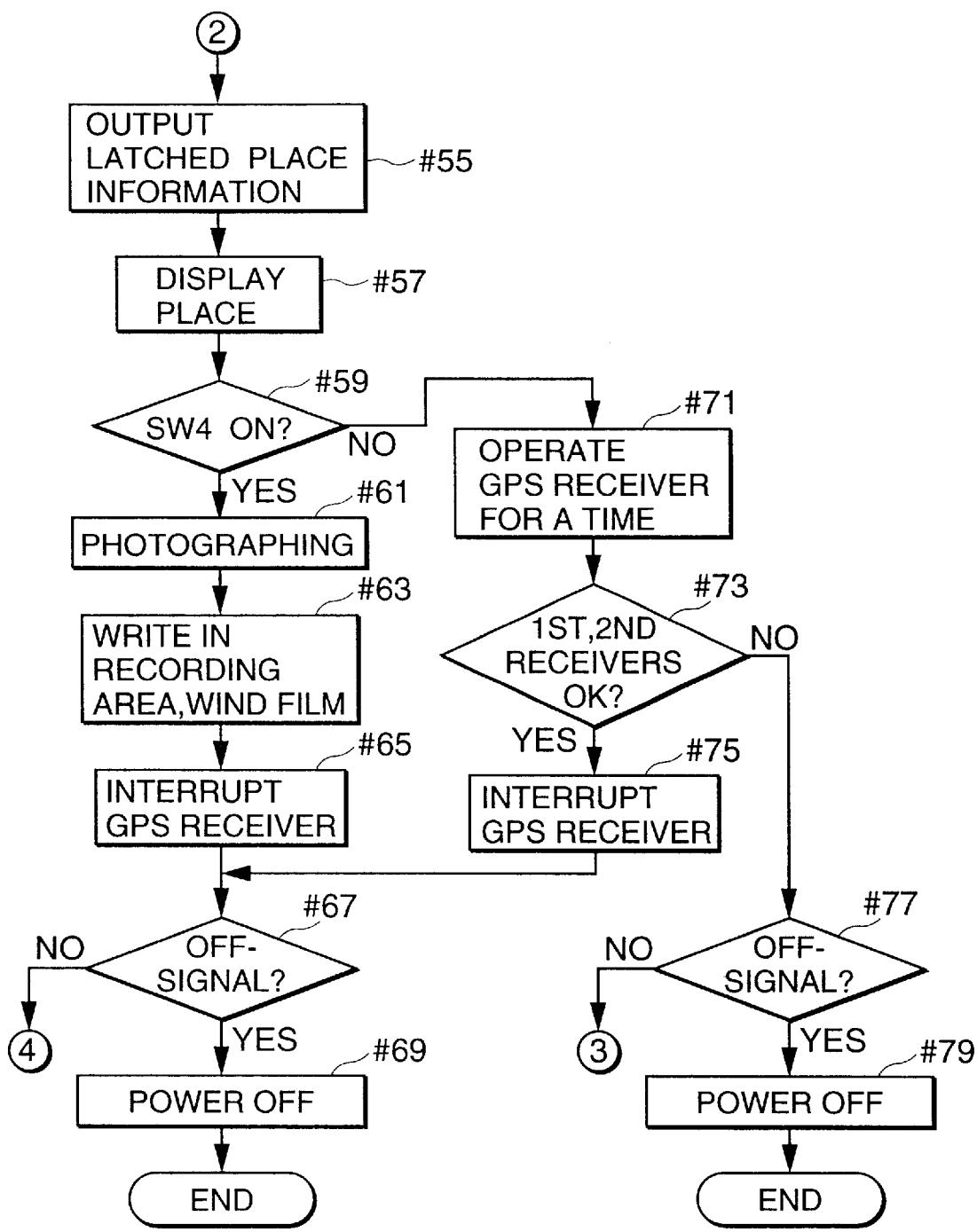

Next, an exemplary operation of the camera 10 thus constructed will be described with reference to a flow chart combinedly shown in FIGS. 5 to 7.

When the camera 10 is electrically activated (Step #1), the release button 40 is pressed halfway and the switch SW3 is turned on, the power supply switch SW1 is turned on, thereby activating the first and second radio receivers 141, 142 (Step #3). When the switch SW3 is turned on, photographing preparation including focusing and an exposure calculation is performed. Subsequently, the selector 144 is operated to connect the first radio receiver 141 with the place information generating unit 16 (Step #5), and the output from the reception detector 148 is sent to the controller 24, which in turn judges whether the receptive state of the first radio receiver 141 is satisfactory (Step #7). If the judgment result is in the negative, the selector 144 is operated to connect the second radio receiver 142 with the place information generating unit 16 (Step #9), and the output from the reception detector 149 is sent to the controller 24, which in turn judges whether the receptive state of the second radio receiver 142 is satisfactory (Step #11).

If the judgment result in Step #7 is in the affirmative, the ID information extractor 163 extracts ID information from signals demodulated by the demodulator 145 of the first radio receiver 141, and the place information corresponding to the extracted ID information is read from the ROM table 162 and the name of place is displayed in the display unit 22 (Step #13). Also, if the judgment result in Step #11 is in the affirmative, the ID information is extracted from the signals demodulated by the demodulator 146 of the second radio receiver 142, and the place information corresponding to the extracted ID information is displayed in the display unit 22 (Step #13). When the judgment result in Step #7 or #11 is in the affirmative and the place information is read from the ROM table 162, this place information is latched by the latching unit 18.

Subsequently, it is judged whether the switch SW4 has been turned on by fully pressing the release button 40 (Step #15), and photographing is performed if the judgment result is in the affirmative, thereby recording an optical image of an object in the film 121 (Step #17). Upon the completion of photographing, a write signal is sent from the controller 24 to the magnetic recording device 123 and the film 121 is wound by a motor. At this time, the name of place displayed in the display unit 22 in Step #13 is written in the magnetic recording area 124 of the film 121 together with the date information and the like by the magnetic head 125 (Step #19).

It is then judged whether an off-signal of the power supply has been detected (Step #21). If the judgment result is in the affirmative, a mode in which the power supply is turned off to reduce the power consumption is set, thereby being brought into a sleep state where only specific operations can be detected (Step #23). If the judgment result in Step #15 or #21 is in the negative, this routine returns to Step #5, thereby preparing for next photographing.

If the judgment result in Step #11 is in the negative, the power supply switch SW2 is turned on to activate the GPS receiver 143 (Step #25). Simultaneously, the selector 144 is activated to connect the GPS receiver 143 with the place information generating unit 16 (Step #27), and the output from the reception detector 150 is sent to the controller 24, which in turn judges whether the receptive state of the GPS receiver 143 is satisfactory (Step #29). If the judgment result is in the affirmative, the latitude and longitude are calculated by the position calculator 164 based on the signal demodulated by the demodulator 147 of the GPS receiver 143. The place information corresponding to the calculated latitude and longitude is read from the ROM table 162 and the name of place is displayed in the display unit 22 (Step #31). When the place information is read from the ROM table 162 in response to the affirmative judgment result in Step #29, it is latched by the latching unit 18.

It is then judged whether the switch SW4 has been turned on by fully pressing the release button 40 (Step #33). If the judgment result is affirmative, photographing is performed to record the optical image of the object in the film 121 (Step #35). Upon the completion of photographing, the write signal is sent from the controller 24 to the magnetic recording device 123 and the film 121 is wound by the motor. At this time, the name of place displayed in the display unit 22 in Step #31 is written in the magnetic recording area 124 of the film 121 together with the date information and the like by the magnetic head 125 (Step #37).

Subsequently, the power supply switch SW2 is turned off for the power-saving purpose and the operation of the GPS receiver 143 is temporarily interrupted (Step #39). Then, it is judged whether the off-signal of the power supply has been detected (Step #41). If the judgment result is in the affirmative, the mode in which the power supply is turned off to reduce the power consumption is set, thereby being brought into a sleep state where only specific operations can be detected (Step #43). If the judgment result in Step #41 is in the negative, this routine returns to Step #5, thereby preparing for next photographing.

If the judgment result in Step #33 is in the negative, the GPS receiver 143 is operated for a predetermined time to trace the present location of the camera 10 (Step #45). Upon the elapse of the predetermined time, it is judged whether the receptive state of at least one of the first and second radio receivers 141, 142 is satisfactory (Step #47). If the judgment result is in the affirmative, the power supply switch SW2 is turned off for the power-saving purpose and the operation of the GPS receiver 143 is temporarily interrupted (Step #49). Then, this routine returns to Step #41 and subsequent steps are repeated.

If the judgment result in Step #47 is in the negative, it is judged whether the off-signal of the power supply has been detected (Step #51). If the judgment result is in the affirmative, the mode in which the power supply is turned off to reduce the power consumption is set, thereby being brought into a sleep state where only specific operations can be detected (Step #53). If the judgment result in Step #51 is in the negative, this routine returns to Step #29, thereby preparing for next photographing.

If the judgment in Step #29 is in the negative, the place information latched by the latching unit 18 is outputted (Step #55) and the name of place is displayed in the display unit 22 (Step #57). It is then judged whether the switch SW4 has been turned on by fully pressing the release button 40 (Step #59), and photographing is performed if the judgment result is in the affirmative, thereby recording the optical image of the object in the film 121 (Step #61). Upon the completion of photographing, the write signal is sent from the controller 24 to the magnetic recording device 123 and the film 121 is wound by the motor. At this time, the name of place displayed in the display unit 22 in Step #57 is written in the magnetic recording area 124 of the film 121 together with the date information and the like by the magnetic head 125 (Step #63).

The place information outputted in Step #55 is the place information when any of the first and second receivers 141, 142 and the GPS receiver 143 has a satisfactory receptive state during the previous photographing. Accordingly, this place information may represent a place of photographing for the present photographing. If the name of place displayed in the display unit 22 is correct, photographing may be performed without changing it. If the name of place displayed in the display unit 22 differs from an actual name of place, photographing may be performed after selecting a suitable name of place by operating, for example, the button 36 and the dial 38.

Subsequently, the power supply switch SW2 is turned off for the power-saving purpose and the operation of the GPS receiver 143 is temporarily interrupted (Step #65). Then, it is judged whether the off-signal of the power supply has been detected (Step #67). If the judgment result is in the affirmative, the mode in which the power supply is turned off to reduce the power consumption is set, thereby being brought into a sleep state where only specific operations can be detected (Step #69). If the judgment result in Step #67 is in the negative, this routine returns to Step #5, thereby preparing for next photographing.

If the judgment result in Step #59 is in the negative, the GPS receiver 143 is operated for a predetermined time (Step #71). Upon the elapse of the predetermined time, it is judged whether the receptive state of at least one of the first and second radio receivers 141, 142 is satisfactory (Step #73). If the judgment result is in the affirmative, the power supply switch SW2 is turned off for the power-saving purpose and the operation of the GPS receiver 143 is temporarily interrupted (Step #75). Then, this routine returns to Step #67 and subsequent steps are repeated.

If the judgment result in Step #73 is in the negative, it is judged whether the off-signal of the power supply has been detected (Step #77). If the judgment result is in the affirmative, the mode in which the power supply is turned off to reduce the power consumption is set, thereby being brought into a sleep state where only specific operations can be detected (Step #79). If the judgment result in Step #77 is in the negative, this routine returns to Step #29, thereby preparing for next photographing.

Also, when the name of place is displayed in the display unit 22 after the affirmative judgment result in Step #7 or #11, the name of place corresponding to table C shown in FIG. 2 is displayed by the initialization. At this time, if the button 28 shown in FIG. 3 is pressed as described above, a display selecting mode is entered, thereby enabling the operator of the camera 10 to select a desired name of place from table D shown in FIG.2. In this case, the selected name of place is displayed in the display unit 22 in Step #13.

Figure 8:
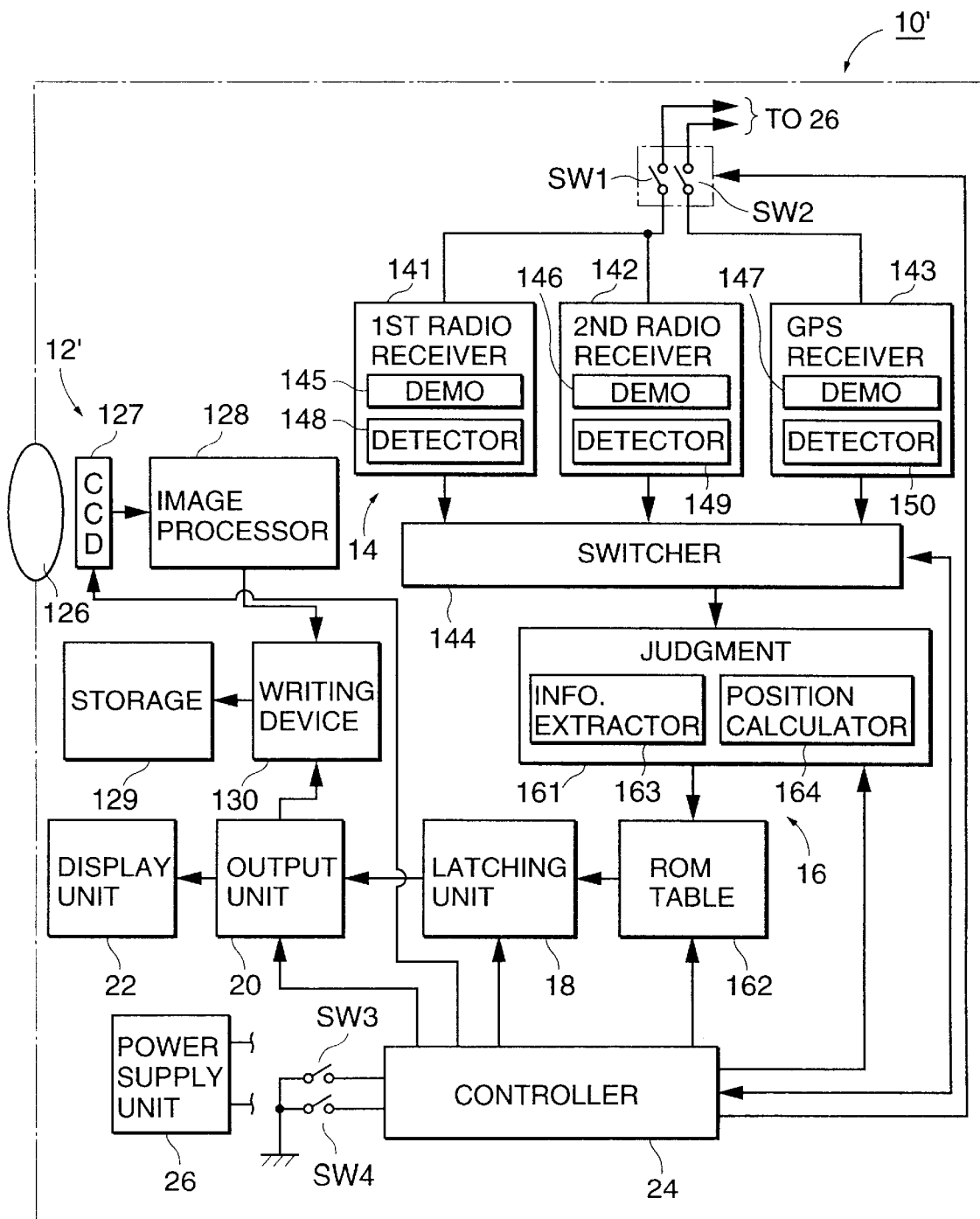
FIG. 8 is a block diagram showing a construction of a camera according to another embodiment of the invention.

FIG. 8 is a block diagram of a camera according to another embodiment of the invention. In FIG. 8, a camera 10' is a video camera, a digital still camera or the like adopting an electronic recording system and differs from the camera 10 of FIG. 1 only in the construction of an image sensing unit 12'. In other words, the camera 10' basically has a construction identical to that of the camera 10 of FIG. 1 except for some points. Accordingly, only different points from the camera 10 of FIG. 1 will be described, but the same portions as the camera 10 are not described by identifying them by the same reference numerals.

Specifically, the image sensing unit 12' of the camera 10' is provided with CCDs (Charge Coupled Device) 127 as an area sensor for photoelectrically converting an optical image of an object into an image signal, a lens 126 for focusing the optical image of the object on the CCDs 127, an image processor 128, a storage 129 and a writing device 130 for writing data in the storage 129. The image processor 128 applies known signal processings including analog-to-digital (A/D) conversion, γ-correction and compression to the image signal obtained by the photoelectric conversion. The storage 129 may be a magnetic recording medium such as a magnetic tape, a magnetic disk or a magneto-optical disk or a semiconductor storage device such as a RAM disk or a RAM card.

Accordingly, in the camera 10', when the optical image of the object is sensed and converted into an electrical signal by the CCDs 127 and is recorded in the storage 129 after specified signal processings are applied thereto in the image processor 128, place information simultaneously outputted from a place information generating unit 16 is recorded in the storage 129 together with date information and other information while being corresponded with the photographed image.

With the cameras 10, 10' according to the embodiments of the invention, the first and second radio receivers 141, 142 which require a smaller power consumption is preferentially used over the GPS receiver 143 in obtaining place information, and the GPS receiver 143 is used only when the receptive states of electromagnetic waves of the first and second radio receivers 141, 142 are unsatisfactory. Thus, the power consumption of the camera can be saved. As a result, the built-in battery needs not be made larger as in the case where only the GPS receiver is used, which in turn enables the cameras 10, 10' to be made smaller.

Since the camera 10 is provided with the two radio receivers 141, 142 having different communications systems and the GPS receiver 143 and it is sufficient if any of the receivers functions, place information can be obtained in an extensive area. The camera 10 is further provided with the latching unit 18 and place information outputted from the place information generating unit 16 is renewably latched every time place information is outputted. Accordingly, place information latched by the latching unit 18 can be used if none of the receivers functions during photographing. As a result, place information can be securely recorded in the recording medium.

Further, since the camera 10 is provided with the display unit 22, the camera operator can confirm by the eye whether or not the name of place displayed there is correct. As a result, proper place information can be constantly recorded in the film 121 or the storage 129. If the name of place displayed in the display unit 22 is not proper, correct place name stored in the ROM table 162 can be selected by operating the dial 38 or the like. In this respect as well, proper place information can be constantly recorded in the film 121 or the storage 129.

FIG. 9 is a diagram showing a modification of the filing format of place information shown in FIG. 2. If a cellular phone system having a smaller cell than the presently available one is adopted in the future in the U.S.A., the place information as shown in FIG. 9 is available.

In this modification, the place information is represented by 16-bit data. Each element of table A represented by the most significant bit is allotted with table B including a plurality of elements represented by six subsequent bits. Each element of table B is allotted with table C including a plurality of elements represented by six further subsequent bits. Each element of table C is allotted with table D including a plurality of elements represented by three least significant bits. Table A contains elements "Domestic" and "Foreign". Table B contains elements representing regions or states or prefectures such as "New York", "California" and "Washington". Table C contains elements representing cities such as "San Francisco", "Los Angeles". Table D contains elements representing towns and places of interest such as "Long Beach", "Hollywood".

Further, the following modifications may be appreciated.

(1) Although the two radio receivers 141, 142 having different communications systems, i.e., the small area radio communications system and the large area radio communications system, are used in the foregoing embodiments, only either one of them may be used. Alternatively, three or more radio receivers having different communications systems may be used. In this case, it is appropriate that three or more radio receivers are preferentially used over the GPS receiver and are used with a predetermined priority among them.

(2) It should be noted that in addition to the radio communications systems, such as PHS, mobile (handy) phone in Japan, described above, other presently available communications systems such as Personal Communication Services (PCS), Advanced Mobile Phone Service (AMPS), or those to come in the future or communications systems in other countries such as the Global System for Mobile Communications (GSM), and the North American Dual Mode Cellular (NADC) can be used. Also, it should be noted to use any communications system provided that electromagnetic waves containing ID information of a base station (base station) are transmitted from the base station.

(3) Although the power supply unit 26 is connected with the two radio receivers 141, 142 via the same power supply switch SW1 in the foregoing embodiments, it may be connected with them via separate power supply switches. In such a case, the power can be saved more.

(4) Although the latching unit 18 is provided in the foregoing embodiments, the latching unit 18 is not essential. In the case that no latching unit 18 is provided, place information will not be displayed in the display unit 22 when none of the first and second radio receivers 141, 142 and the GPS receiver 143 can be used. However, in such a case, place information stored in the ROM table 162 may be read by operating the dial 38 or the like, so that a proper name of place can be displayed in the display unit 22.

As described above, an apparatus includes a positioning device. The positioning device is provided with a radio receiver for receiving electromagnetic waves containing at least base information transmitted from a base station, and a GPS receiver for receiving electromagnetic waves from a plurality of artificial satellites. Accordingly, the apparatus is allowed to have a smaller size because of an improved power saving and place information can be obtained in an extensive area.

Further, since a GPS receiver is used when the receptive state detected by a first reception detector of the radio receiver is below a predetermined reception level, the power consumption can be further saved and the apparatus can be made even smaller.

Further, since the radio receiver includes at least two types of receivers having different communication systems, place information can be obtained in a more extensive area while the power consumption is saved.

Further, since a latching unit is provided for latching place information obtained when the receptive state is equal to or above the predetermined reception level, place information can be recorded in a recording medium even when none of the receivers can be used.

Further, since a display unit is provided for displaying obtained place information, proper place information can be constantly recorded in a recording medium.

Further, since the display unit displays specific information according to photographing, date information and other information can be displayed in addition to place information according to photographing.

In the above description, furthermore, the terms "large area radio communications system" and "small area radio communications system" have been used. The adjectives "large" and "small" merely mean the relativity between the respective areas of the two radio communications systems, and does not mean the absolute dimension of the two radio communications systems. In other words, if there is a radio communications system having a smaller area than the PHS, the PHS can be referred to as a large area radio communications system.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus, comprising:
   a radio receiver which receives electromagnetic waves transmitted from a given radio base station, the electromagnetic waves including base information concerning an identification of the given radio base station;
   a GPS receiver which receives electromagnetic waves transmitted from each of a plurality of artificial satellites, the electromagnetic waves including information useable for positioning;
   a place information generator which generates place information based on one of the base information of the electromagnetic waves received by the radio receiver and the information of the electromagnetic waves received by the GPS receiver; and a selector which selects activation of one of the radio receiver and the GPS receiver, the selector prioritizing activation of the radio receiver and selecting activation of the GPS receiver if the receptive state of the radio receiver is judged to be unsatisfactory.

2. An apparatus according to claim 1, wherein the radio receiver includes:
a first receiver unit which receives electromagnetic waves of a first radio communications system; and
a second receiver unit which receives electromagnetic waves of a second radio communications system, the second radio communications system being different from the first radio communications system.

3. An apparatus according to claim 1, further comprising a latching unit which latches place information generated by the place information generator.

4. An apparatus according to claim 3, wherein the latching unit outputs place information latched in the latching unit if any of the radio receiver and the GPS receiver is in an unsatisfactory receptive state.

5. An apparatus according to claim 1, further comprising a display unit which displays generated place information.

6. An apparatus according to claim 1, wherein the apparatus is a camera, and the generated place information is in connection with a place of photographing.

7. An apparatus according to claim 6, further comprising a recording unit which records generated place information on a film.

8. An apparatus, comprising:
a radio receiver which receives electromagnetic waves transmitted from a given radio base station, the electromagnetic waves including base information concerning an identification of the given radio base station;
a GPS receiver which receives electromagnetic waves transmitted from each of a plurality of artificial satellites, the electromagnetic waves including information useable for positioning; and
a prescribed controller prioritizing activation of the radio receiver, and place information is obtained based on the base information of the electromagnetic waves received by the radio receiver, and
the GPS receiver is activated and place information is obtained based on the information of the electromagnetic waves received by the GPS receiver if the receptive state of the radio receiver is judged to be unsatisfactory.

9. An apparatus according to claim 8, wherein the radio receiver includes:
a first receiver unit which receives electromagnetic waves of a first radio communications system; and
a second receiver unit which receives electromagnetic waves of a second radio communications system, the second radio communications system being different from the first radio communications system.

10. An apparatus according to claim 8, wherein the obtained place information is memorized.

11. An apparatus according to claim 10, wherein the memorized place information is outputted if any of the radio receiver and the GPS receiver is in an unsatisfactory receptive state.

12. An apparatus according to claim 8, wherein the obtained place information is displayed.

13. An apparatus according to claim 8, wherein the apparatus is a camera, and the obtained place information is recorded in connection with photographing.

14. An apparatus according to claim 13, wherein the obtained place information is recorded on a film.

15. An apparatus, comprising:
a first radio receiver which receives electromagnetic waves transmitted from a given radio base station of a first radio conmmunications system, the electromagnetic waves including base information concerning an identification of the given radio base station;
a second radio receiver which receives electromagnetic waves transmitted from a given radio base station of a second radio communications system different from the first radio communications system, the electromagnetic waves including base information concerning an identification of the given radio base station;
a GPS receiver which receives electromagnetic waves transmitted from each of a plurality of artificial satellites, the electromagnetic waves including information useable for positioning; and
a prescribed controller, said controller judges whether the receptive state of the first radio receiver is satisfactory, and place information is adopted based on the base information of the electromagnetic waves received by the first radio receiver if the receptive state of the first radio receiver is judged to be satisfactory,
wherein said controller judges whether the receptive state of the second radio receiver is satisfactory if the receptive state of the first radio receiver is judged to be unsatisfactory, and place information is adopted based on the base information of the electromagnetic waves received by the second radio receiver if the receptive state of the second radio receiver is judged to be satisfactory,
wherein said controller judges whether the receptive state of the GPS receiver is satisfactory if the receptive state of the second radio receiver is judged to be unsatisfactory, and place information is adopted based on the information of the electromagnetic waves received by the GPS receiver if the receptive state of the GPS receiver is judged to be satisfactory, and
pre-stored place information is adopted if the receptive state of the GPS receiver is judged to be unsatisfactory.

16. An apparatus, comprising:
a radio receiver which receives electromagnetic waves transmitted from a telephone communications system, the electromagnetic waves including base information concerning an identification of the telephone communications system;
a GPS receiver which receives electromagnetic waves transmitted from each of a plurality of artificial satellites, the electromagnetic waves including information useable for positioning;
a place information generator which generates place information based on one of the base information of the electromagnetic waves received by the radio receiver and the information of the electromagnetic waves received by the GPS receiver; and
a selector which selects activation of one of the radio receiver and the GPS receiver, the selector prioritizing activation of the radio receiver and selecting activation of the GPS receiver if the receptive state of the radio receiver is judged to be unsatisfactory.

17. An apparatus, comprising:
a radio receiver which receives electromagnetic waves transmitted from a telephone communications system, the electromagnetic waves including base information concerning an identification of the telephone communications system;

a GPS receiver which receives electromagnetic waves transmitted from each of a plurality of artificial satellites, the electromagnetic waves including information useable for positioning; and a prescribed controller prioritizing activation of the radio receiver, and place information is obtained based on the base information of the electromagnetic waves received by the radio receiver, and the GPS receiver is activated and place information is obtained based on the information of the electromagnetic waves received by the GPS receiver if the receptive state of the radio receiver is judged to be unsatisfactory.

18. The apparatus according to claim 16, further comprising a latching unit which latches place information generated by the place information generator.

19. The apparatus according to claim 18, wherein the latching unit outpus place information latched in the latching unit if any of the radio receiver and the GPS receiver is in an unsatisfactory state.

20. The apparatus according to claim 16, further comprising a display unit which displays generated place information.

21. The apparatus according to claim 16, wherein the apparatus is a camera, and the generated place information is in connection with a place of photographing.

22. The apparatus according to claim 21, further comprising a recording unit which records generated place information on a film.

23. The apparatus according to claim 17, wherein the radio receiver includes:

a first receiver unit which receives electromagnetic waves of a first radio communications system, the second radio communications system being different from the first radio communications system; and a second receiver unit which receives electromagnetic waves of a second radio communications system, the second radio communications system being different from the first radio communications system.

24. The apparatus according to claim 17, wherein the obtained place information is memorized.

25. The apparatus according to claim 24, wherein the memorized place information is outputted if any of the radio receiver and the GPS receiver is in an unsatisfactory receptive state.

26. The apparatus according to claim 17, wherein the obtained place information is displayed.

27. The apparatus according to claim 17, wherein the apparatus is a camera, and the obtained place information in connection with photographing.

28. The apparatus according to claim 27, wherein the obtained place information is recorded on a film.

* * * * *